(12) United States Patent
Ito et al.

(10) Patent No.: US 8,113,718 B2
(45) Date of Patent: Feb. 14, 2012

(54) RESIN-MADE CAGE AND BEARING

(75) Inventors: Takashi Ito, Mie (JP); Shohei Nakamura, Mie (JP); Masayuki Nozaki, Aichi (JP); Masaki Egami, Mie (JP); Takuya Ishii, Mie (JP); Toyohiko Ota, Tokyo (JP); Akira Okayasu, Tokyo (JP); Rei Mihara, Tokyo (JP)

(73) Assignee: NTN Corporation, Osaka (JP)

( * ) Notice: Subject to any disclaimer, the term of this patent is extended or adjusted under 35 U.S.C. 154(b) by 678 days.

(21) Appl. No.: 12/224,922

(22) PCT Filed: Mar. 7, 2007

(86) PCT No.: PCT/JP2007/054394
§ 371 (c)(1),
(2), (4) Date: Sep. 9, 2008

(87) PCT Pub. No.: WO2007/105552
PCT Pub. Date: Sep. 20, 2007

(65) Prior Publication Data
US 2009/0074339 A1    Mar. 19, 2009

(30) Foreign Application Priority Data
Mar. 10, 2006    (JP) .................. 2006-065547

(51) Int. Cl.
*F16C 33/44*    (2006.01)
*F16C 33/38*    (2006.01)
(52) U.S. Cl. .................. 384/527; 384/463; 384/572
(58) Field of Classification Search .................. 384/463, 384/469, 470, 492, 527, 572, 606, 614, 623, 384/902–903, 907–908, 911
See application file for complete search history.

(56) References Cited

U.S. PATENT DOCUMENTS
2,035,417 A * 3/1936 Allendorff .................. 384/527
(Continued)

FOREIGN PATENT DOCUMENTS
GB    2389631 A  *  12/2003
(Continued)

OTHER PUBLICATIONS
Masataka Nosaka, The Official Journal of the Japan Society for Composite Materials, vol. 20, No. 6, (1994) 215-223.
(Continued)

*Primary Examiner* — Marcus Charles
(74) *Attorney, Agent, or Firm* — Hedman & Costigan, P.C.; James V. Costigan

(57) ABSTRACT

It is an object of the present invention to provide a cage that can be used in a cryogenic-temperature environment or a vacuum without providing the cage with a complicated construction and without performing special treatment and a bearing using the cage. A cage made of resin has an annular main body having a plurality of pocket portions radially penetrating the main body; and a plurality of pocket members, provided on the annular main body, which hold rolling elements of a rolling bearing. The main body is a molding of a first resin composition consisting of a first resin and a solid lubricant mixed therewith; and at least a rolling element-retaining surface of each of the pocket members is made of a second resin composition containing fluorocarbon resin as a main component thereof. The molding of the first resin composition has a tensile strength of not less than 30 MPa and a heat-resistant temperature of not less than 200° C. The second resin composition is a fluorocarbon resin composition. The rolling bearing is constructed of an inner ring, an outer ring, the rolling elements interposed between the inner ring and the outer ring, and the cage. The rolling bearing is used for a turbopump, of a rocket engine, which uses a liquid fuel.

14 Claims, 4 Drawing Sheets

U.S. PATENT DOCUMENTS

| | | | |
|---|---|---|---|
| 3,529,875 A * | 9/1970 | McKee | 384/469 |
| 3,733,110 A * | 5/1973 | Davis | 384/520 |
| 3,896,036 A * | 7/1975 | Cairns | 508/104 |
| 4,764,037 A * | 8/1988 | Hawkinson | 384/527 |
| 4,781,877 A * | 11/1988 | Rabe | 29/898.067 |
| 5,223,203 A * | 6/1993 | Seifert et al. | 264/241 |
| 5,230,570 A | 7/1993 | Bursey, Jr. | |
| 5,486,052 A | 1/1996 | Sibley | |
| 5,948,340 A * | 9/1999 | Terada et al. | 264/328.8 |
| 5,988,891 A * | 11/1999 | Yamamoto et al. | 384/463 |
| 6,378,670 B1 * | 4/2002 | Kawakami et al. | 188/256 |
| 6,419,069 B1 * | 7/2002 | Teramachi | 384/447 |
| 6,702,469 B1 * | 3/2004 | Taniguchi et al. | 384/418 |
| 6,994,475 B2 * | 2/2006 | Doll et al. | 384/492 |
| 2002/0051596 A1 | 5/2002 | Yamamoto | |
| 2002/0061151 A1 | 5/2002 | Hamamoto | |
| 2002/0168125 A1 | 11/2002 | Kahlman | |
| 2003/0063825 A1 | 4/2003 | Ooltsu | |

FOREIGN PATENT DOCUMENTS

| | | | |
|---|---|---|---|
| JP | 58-180839 A | | 10/1983 |
| JP | 64-012130 A | | 1/1989 |
| JP | 02-20854 B2 | | 5/1990 |
| JP | 04-321815 A | | 11/1992 |
| JP | 06280881 A | * | 10/1994 |
| JP | 2001140898 A | * | 5/2001 |
| JP | 2002-106572 A | | 4/2002 |
| JP | 2003-232363 A | | 8/2003 |
| JP | 2005133047 A | * | 5/2005 |
| JP | 2005-201334 A | | 7/2005 |

OTHER PUBLICATIONS

EPO Search Report dated Oct. 15, 2010.

* cited by examiner (a) (b)

RESIN-MADE CAGE AND BEARING

CROSS-REFERENCE TO RELATED APPLICATIONS

Not Applicable

STATEMENT REGARDING FEDERALLY SPONSORED RESEARCH OR DEVELOPMENT

Not Applicable,

INCORPORATION-BY-REFERENCE OF MATERIAL SUBMITTED ON A COMPACT DISK

Not Applicable

REFERENCE TO A MICROFICHE APPENDIX

Not Applicable

BACKGROUND OF THE INVENTION

1. Field of the Invention

The present invention relates to a cage made of resin and more particularly to a cage made of resin suitable for a bearing which is used in a cryogenic-temperature environment in which liquid hydrogen, liquid oxygen, liquid nitrogen, LNG, and the like are used or used in a vacuum.

2. Description of Related Art

In a rolling bearing, rolling elements such as balls and cylindrical rollers are arranged in a raceway space disposed between an inner ring and an outer ring, and the rolling elements are retained by a cage. In many cases, the cage is guided at an inner-ring side or an outer-ring side. There is a case in which the rolling bearing is used in a low-temperature environment.

An angular contact ball bearing used in a rotation-supporting portion of a turbopump, of a rocket engine, which uses a liquid fuel, is a representative example of a bearing used in the low-temperature environment. FIG. 3 shows an example of the construction of an angular contact ball bearing 1 for use in the turbopump. The bearing is constructed of four kinds of component parts including an inner ring 2, an outer ring 3, a plurality of balls 4a serving as rolling elements 4, and a cage 5. The inner ring 2 and the outer ring 3 contact the balls 4a at a predetermined angle θ (contact angle) to a radial center line A. A radial load and a one-direction axial load are applicable to the bearing.

There is a case in which the bearing is used in a strict condition where the bearing is rotated at a high speed of not less than 1.6 millions in a dn value (=inner diameter (mm) of inner ring×number of rotations rpm of inner ring) in a cryogenic-temperature environment in which liquid hydrogen or liquid oxygen is present. Therefore the inner ring 2, the outer ring 3, and a plurality of the balls 4a are made of tough martensitic stainless steel, and the cage 5 is made of a composite material of polytetrafluoroethylene resin (hereinafter abbreviated as PTFE) having lubricating performance reinforced with glass fibers (non-patent document 1).

FIG. 4 shows an example of conventional cages having a pocket portion. FIG. 4(a) is a perspective view of the cage. FIG. 4(b) is a side elevation of a section D-D of FIG. 4(a). To provide a cage 5 with a pocket portion 5a, a method of forming the main body of the cage 5 of the PTFE and a method of forming the main body thereof of a metal are used.

In a known method of forming the main body of the cage 5 of the PTFE, after the cylindrically layered glass woven cloths are impregnated with the PTFE and calcined, the main body of the cage 5 and the pocket portion 5a are formed by mechanical processing, and the treatment of dissolving the glass fibers present on the surface to be processed is performed with hydrogen fluoride (patent document 1).

In a known method of forming the main body of the cage 5 of the metal, the main body of the cage 5 and the pocket portion 5a are formed by mechanical processing and the pocket member made of the PTFE is inserted into the cage (patent document 2).

In the case of the method disclosed in the patent document 1, the main body of the cage 5 is made of the composite material consisting of the sintered cylindrically layered glass woven cloths impregnated with the PTFE. Therefore the patent document 1 has a problem of (1): The material is very expensive, (2): After the material is processed into the shape of the cage, the hydrogen fluoride is required to dissolve the glass fiber present on the surface to be processed. Thus the production cost is very high, and (3): Because the method of producing the material is special, the productivity is low, and a long lead time is necessary.

In the method of the patent document 2, because the configuration of the cage is complicated, it is difficult to perform mechanical processing of the metal portion of the main body thereof.

Non-patent document 1: Masataka Nosaka, journal published by Japan Society for Composite Materials, 20 volumes, No. 6 (1994), 215-223

Patent document 1: Examined Japanese Patent Application No. 2-20854

Patent document 2: Japanese Patent Application Laid-Open No. 2003-232363

DISCLOSURE OF THE INVENTION

Problems to be Solved by the Invention

The present invention has been made to cope with the above-described problems. It is an object of the present invention to provide a cage made of resin that can be used in a cryogenic-temperature environment or in a vacuum without providing the cage with a complicated construction and without performing special treatment; and a bearing which uses the cage.

BRIEF SUMMARY OF THE INVENTION

A cage of the present invention made of resin has an annular main body having a plurality of pocket portions radially penetrating the main body and a plurality of pocket members, provided on the annular main body, which hold rolling elements of a rolling bearing. The main body of the cage is a molding of a first resin composition consisting of a first resin and a solid lubricant mixed therewith. At least a rolling element-retaining surface of each of the pocket members is made of a second resin composition containing fluorocarbon resin as a main component thereof.

The molding of the first resin composition has a tensile strength of not less than 30 MPa and a heat-resistant temperature of not less than 200° C. In the present invention, the tensile strength is measured by the method of JIS K7161. The heat-resistant temperature is measured by the method of ASTM D648.

The first resin includes at least one resin selected from the group consisting of aromatic polyether ether ketone and polyphenylene sulfide.

The solid lubricant contained in the first resin composition is PTFE. A mixing ratio of the solid lubricant to an entirety of the first resin composition is set to 10 wt % to 60 wt %.

The fluorocarbon resin is polytetrafluoroethylene resin. The second resin composition contains the fluorocarbon resin and a reinforcing material.

The bearing of the present invention comprising an inner ring, an outer ring, rolling elements interposed between the inner ring and the outer ring, and a cage for retaining the rolling elements, wherein as the cage, a cage made of resin is used.

The bearing is used for a turbopump, of a rocket engine, which uses a liquid fuel.

EFFECT OF THE INVENTION

In the cage of the present invention made of resin, the main body is a molding of the first resin composition composed of the first resin and the solid lubricant mixed therewith, and at least the rolling element-retaining surface of the pocket member holding the rolling elements of the rolling bearing is made of the second resin composition containing the fluorocarbon resin as the main component thereof. Therefore the strength of the cage and the lubricating property thereof are compatible with each other The molding of the first resin composition has a tensile strength of not less than 30 MPa and a heat-resistant temperature of not less than 200° C. The second resin composition is the fluorocarbon resin composition. Therefore the pocket member is capable of smoothly contacting the rolling elements. Further the strength of the cage and the lubricating property thereof are compatible with each other in the cryogenic-temperature environment.

It is possible to produce the main body of the cage of the present invention made of resin by only molding the first resin composition. Therefore it is unnecessary to perform mechanical processing such as machining and thus possible to improve the productivity.

The bearing of the present invention has the inner ring, the outer ring, and the rolling elements interposed between the inner ring and the outer ring, and the cage for retaining the rolling elements. The cage is made of the resin. Therefore the strength of the bearing used in the cryogenic-temperature environment and the lubricating property thereof are compatible with each other.

Because the strength of the bearing and the lubricating property thereof are compatible with each other in the cryogenic-temperature environment, the bearing can be used for a turbopump, of a rocket engine, which uses a liquid fuel.

DETAILED DESCRIPTION OF THE INVENTION

It has been found that when a bearing is used in a cryogenic-temperature environment, excellent mechanical strength and lubricating performance are displayed by the bearing in which the main body of the cage is formed by molding a first resin composition, containing a solid lubricant, which has a certain degree of mechanical strength and wear property and in which the pocket portion of the cage is composed of a second resin composition containing fluorocarbon resin as its main component. It is conceivable that the main body of the cage made of the resin displays an excellent mechanical strength and wear property, that the fluorocarbon resin migrates from a pocket member, mounted on the pocket portion, which is composed of the second resin composition containing the fluorocarbon resin as its main component to sliding surfaces of rolling elements and attaches thereto, and that the fluorocarbon resin which has migrated and attached to the rolling elements migrates to a raceway of each of inner and outer rings, thus providing a lubricating action. The present invention is based on the above-described finding.

As the resin that can be used for the first resin composition forming the main body of the cage of the present invention made of resin, it is possible to use the resin which allows the first resin composition to have a tensile strength of not less than 30 MPa and a heat-resistant temperature of not less than 200° C. As such a resin, super-engineering plastic is preferable. By using the super-engineering plastic which allows the resin composition to have the tensile strength of not less than 30 MPa and the heat-resistant temperature of not less than 200° C., wear resistance and durability demanded for the rolling bearing can be improved. As examples of the heat-resistant temperatures of resins when the resins are singly used, not more than 100° C. in general-purpose plastics such polyethylene, polyvinyl chloride, polypropylene, polystyrene, and the like; not less than 100° C. in general-purpose engineering plastics such as polyacetal, polycarbonate, modified polyphenylene ether (PPE), polybutylene terephthalate (PPB), and the like; and not less than 150° C. in the super-engineering plastic.

As the super-engineering plastic, it is possible to list polyimide-based resin such as polyimide (hereinafter abbreviated as PI), polyetherimide, polyamide-imide; polyarylene sulfide-based resin such as polyphenylene sulfide (hereinafter abbreviated as PPS); aromatic polyether ketone-based resin such as polysulfone, polyether sulfone, polyarylate, aromatic polyether ether ketone (hereinafter abbreviated as PEEK), and aromatic polyether ketone; aliphatic polyamide resin; and aromatic polyamide resin such as polyphthalamide.

Even if these super-engineering plastics have a heat-resistant temperature less than 200° C. when they are used singly, they can be used by adjusting the heat-resistant temperature of the resin composition to not less than 200° C. As methods of obtaining the resin composition having the heat-resistant temperature not less than 200° C., it is possible to use a method of adding a heat-resistant temperature improver such as a filler to the super-engineering plastics and a method of forming a resin mixture by mixing the super-engineering plastic with other super-engineering plastic resin having a high heat-resistant temperature.

Of these super-engineering plastics, the polyimide resin such as the PI; the polyarylene sulfide-based resin such as the PPS; the aromatic polyether ketone-based resin such as the PEEK; and aromatic thermosetting resin are preferable because these super-engineering plastics are excellent in the wear resistance and self-lubricating property thereof. The use of these resins allows a resin film to be formed easily on the surfaces of rolling elements. A material that can be injection-molded is preferable because it has a high yield and improves the productivity. The aromatic polyether ketone-based resin such as the PEEK and the polyarylene sulfide resin such as the PPS are especially preferable.

As the solid lubricant that can be used for the main body of the cage of the present invention made of resin, it is possible to list PTFE, molybdenum disulfide, tungsten disulfide, graphite, antimony sulfide, and boron compounds such as boron nitride. Of these solid lubricants, it is preferable to use the PTFE that has a favorable compatibility with the super-engineering plastics, a high moldability into a cage having a complicated configuration, and is excellent in the property of lowering the friction coefficient and wear amount of a sliding portion at a cryogenic-temperature. It is preferable that the mixing ratio of the solid lubricant to the entire first resin composition is 10 to 60 wt %. When the mixing ratio thereof is less than 10 wt %, the sliding property of the main body of the cage made of resin deteriorates, whereas when the mixing ratio thereof is more than 60 wt %, the mechanical strength of the main body of the cage made of resin deteriorates.

The main body of the conventional cage is a calcined composite material composed of glass woven cloths cylindrically layered one upon another and impregnated with the PTFE. Thus the main body of the cage has a limitation in the improvement of the mechanical strength and necessitates a long lead time before the delivery of a product. On the other hand, in the present invention, it is possible to produce the main body of the cage by only molding the resin composition composed of the super-engineering plastic and the solid lubricant.

Complicated mechanical processing is necessary for the main body of the conventional cage made of a metal. On the other hand, in the present invention, the main body of the cage can be produced by only molding the resin composition composed of the super-engineering plastic and the solid lubricant. Therefore mechanical processing such as machining is eliminated and thus the productivity can be improved.

In the pocket member mounted on the cage of the present invention made of resin, at least the rolling element-retaining surface for retaining the rolling element is made of the second resin composition containing the fluorocarbon resin as its main component.

The main component of the fluorocarbon resin that can be used for the pocket member, as a solid lubricating component, has a migrating property in a vacuum atmosphere. More specifically, it is possible list PTFE, a tetrafluoroethylene-perfluoroalkylvinyl ether copolymer (hereafter abbreviated as PFA), an ethylene-tetrafluoroethylene copolymer (hereafter abbreviated as ETFA), a tetrafluoroethylene-hexafluoropropylene copolymer (FEP), a tetrafluoroethylene-fluoroalkylvinyl ether-fluoroolefin copolymer (EPE), a polychlorotrifluoroethylene copolymer (PCTFE), an ethylene-chlorotrifluoroethylene copolymer (ECTFE), polyvinylidene fluoride (PVDF), and polyvinyl fluoride (PVF). These fluorocarbon resins may be used singly or as mixtures. Of these fluorocarbon resins, the PTFE, the PFA, and the ETFA are preferable. The PTFE is especially favorable because it migrates and attaches to a mating sliding member and is excellent in decreasing the friction coefficient and wear amount of the sliding portion.

It is necessary that the fluorocarbon resin which is the main component of the second resin composition that can be used for the pocket member of the cage of the present invention made of resin is a solid softer than materials of the inner ring, the outer ring, the rolling elements, and the cage and wears little by little owing to sliding contact between the pocket member made of the fluorocarbon resin and the materials of the inner ring, the outer ring, and the rolling elements which are mating sliding members of the pocket member caused by the rotation of the bearing to generate worn powder and forms a lubricating film on sliding surfaces between the pocket member and the inner ring, the outer ring, and the rolling element.

The PTFE may be used singly, but to reinforce its mechanical strength, it is possible to add reinforcing materials such as a fibrous filler, various whiskers, inorganic substances, and the like as necessary. The reinforcing material can be used singly or in combination of not less than two kinds.

It is possible to use the reinforcing material which is excellent in the migration performance to the mating sliding members, decreases the friction coefficient of the sliding portion, and decreases the wear amount thereof. More specifically, as fibrous fillers, it is possible to list carbon fibers such as PAN-based carbon fiber, pitch-based carbon fiber; and inorganic fibers including milled fiber, glass fiber, potassium titanate fiber, boron fiber, silicon carbide fiber, metal fibers such as brass, aluminum, zinc and the like; and organic fibers represented by aramid fiber.

As whiskers, ceramic whiskers such as silicon carbide whisker, silicon nitride whisker, potassium titanate whisker, aluminum borate whisker, zinc oxide whisker, magnesium sulfate whisker, magnesium whisker, magnesium borate whisker, titanium diborate whisker, calcium carbonate whisker, graphite whisker, bismuth-based whisker, magnesium oxide whisker, aluminum nitride wollastonite, and magnesium pyroborate are listed.

As inorganic substances, glass bead, wollastonite, mica, talc, kaolin, silicon dioxide, clay, asbestos, calcium carbonate, magnesium hydroxide, silica, diatomaceous earth, and Carborundum are listed. In addition, flake of aluminum and zinc, calcium fluoride, calcium oxide, magnesium oxide, and copper powder are listed.

It is possible to preferably use the above-described reinforcing materials treated with a silane coupling agent containing epoxy group or amino group.

In the range in which the gist of the present invention is not damaged, it is possible to mix various additives such as a laminar lubricant such as molybdenum disulfide, tungsten disulfide, and the like, an antioxidant, a heat stabilizer, an ultraviolet ray-absorbing agent, a fire retarder, an antistatic agent, a crystallization core agent, a crystallization accelerator, and the like.

The mixing ratio of the reinforcing materials and additives to the entire second resin composition is preferably less than 50 wt %. When the mixing ratio is not less than 50 wt %, the migrating performance of the second resin composition to the mating sliding members is inferior.

The pocket member that can be mounted on the cage of the present invention made of resin is described below. FIG. 2(*a*) is a plan view of a pocket member 6. FIG. 2(*b*) is a front view in a section C-C of FIG. 2(*a*). The pocket member 6 has a stretched circular cylindrical portion 6*a* and a flange portion 6*b* formed on the peripheral edge of the cylindrical portion 6*a*.

As a method of mounting the pocket member consisting of the second resin composition on the pocket portion of the cage of the present invention made of resin, an adhesion method and a fit-in method can be applied. Of these methods, the adhesion method is preferable because in the adhesion method, the processing can be performed simply and workability is favorable. As an adhesive agent, an adhesive agent for a cryogenic-temperature can be used. A two-part type adhesive agent is preferable. An epoxy resin-based adhesive agent is preferable. As the adhesive agent for the cryogenic-temperature, NF Nitofix SK-299 produced by NITTO DENKO Corporation can be used.

The cage of the present invention made of resin can be so constructed that the pocket member 6 can be mounted on the pocket portion 5*a* from the inner-ring side of the pocket portion 5*a* of the main body of the cage or from the outer-ring side of the cage. The pocket member 6 is pressed against the pocket portion 5*a* owing to a centrifugal force caused by the rotation of the bearing and can be stably fixed to the pocket portion 5*a*. Thus the construction of mounting the pocket member 6 on the pocket portion 5*a* from the inner-ring side of the cage is preferable. As an example of this construction, the pocket member 6 is inserted from the inner-ring side of the main body of the cage with the flange portion 6*b* directed toward the inner-ring side of the cage. In the case of adhesion, as shown in FIG. 1(*d*), the pocket member 6 is mounted on the pocket portion 5*a* of the main body of the cage 5 by bonding the cylindrical portion 6*a* of the pocket member 6 and the outer circumferential surface of the flange portion 6*b* thereof to the pocket portion 5*a* through an adhesive layer 7 with an adhesive agent.

Because in the cage of the present invention made of resin, the migration property of the fluorocarbon resin to the rolling elements can be adjusted in conformity to environment where the bearing is used, it is possible to improve the productivity of various kinds of bearings.

Consequently without using a cage made of a special composite material produced at a high cost, it is possible to obtain the resinous cage, for a cryogenic-temperature, which is produced at a high productivity and a low cost and allows a lead time to be short.

Ordinary materials for the bearing are applicable to the outer ring and the inner ring. For example, martensitic stainless steel can be used.

The martensitic stainless steel can be used for the rolling element. Ceramics can be also used therefor. When ceramics are used, silicon nitride ($Si_3N_4$), silicon carbide (SiC), alumina ($Al_2O_3$), zirconia ($ZrO_2$), sialon, and the like are listed.

The bearing of the present invention has the inner ring, the outer ring, and the rolling elements interposed between the inner ring and the outer ring, and the cage for retaining the rolling elements. As the cage, a cage made of resin is used.

The bearing can be used for a turbopump, of a rocket engine, which uses a liquid fuel.

In the bearing of the present invention, by adjusting the composition of the second resin composition composing the pocket member mounted on the pocket portion of the cage, it is possible to control the supply amount of the second resin composition in dependence on a necessary degree of sliding performance of the surface of the pocket member in sliding contact between the pocket member and the rolling elements. Unlike the conventional bearing, the lubricant can be supplied not only from the main body of the cage but also from the pocket member mounted on the cage. Therefore by changing components of the material for the pocket member and the ratio among the components, it is possible to adjust the migration property of the lubricant to the rolling elements in conformity to environment where the bearing is used. Therefore in addition to a use in the low-temperature environment, the applicable range of the bearing can be increased so that the bearing can be used for auxiliary machines of a car in the high-temperature environment.

EXAMPLES

An example of the cage of the present invention made of resin is described below.

Example 1

FIG. 1 is a combination view (partly sectional view) showing a cage made of resin. FIG. 1(a) is a plan view; FIG. 1(b) is a front view of a section A-A of FIG. 1(a); FIG. 1(c) is a side view of a section B-B of FIG. 1(a); and FIG. 1(d) is an enlarged view of a circled portion of FIG. 1(c). As shown in FIGS. 1(a) through 1(d), the cage 5 made of resin has a plurality of the pocket portions 5a, radially penetrating an annular member, on which the pocket members 6 for accommodating the rolling elements respectively are mounted from the inner-ring side. As shown in FIG. 1(d), the pocket member 6 is bonded to the pocket portion 5a through the adhesive layer 7. An enlarged view of the pocket member 6 is shown in FIG. 2.

The main body of the cage 5 made of resin is a molding of the first resin composition composed of PEEK and PTFE.

Means for mixing and kneading the PEEK and the PTFE is not limited to a special means, but only a powder material is dry-blended by a Henschel mixer, a ball mixer, a ribbon blender, a Redige mixer, an ultra-Henschel mixer or the like and thereafter a mixed powder material is fused and kneaded by a fusing extruder such as a biaxial extruder to obtain a pellet (granule) to be molded. In the supply of a filler, side feed may be adopted in fusing and kneading the mixed powder material by the biaxial extruder or the like. As the molding method, it is possible to adopt extrusion molding, injection molding, heating compression molding, and the like. The injection molding is especially preferable in terms of production efficiency. Treatment such as anneal treatment or the like may be adopted to improve the property of a product obtained by molding. As the first resin composition, it is possible to use Bearee PK5060 (tensile strength: 56 MPa, heat-resistant temperature: 250° C.) and PK5300 (tensile strength: 82 MPa, heat-resistant temperature: 250° C.) produced by NTN Corporation.

The pocket member 6 mounted on the pocket portion 5a provided on the main body of the resinous cage 5 consisting of the PEEK and the PTFE consisted of the fluorocarbon resin composition. The fluorocarbon resin of the fluorocarbon resin composition migrates and attaches to the sliding surfaces of the rolling elements. The fluorocarbon resin that has migrated and attached to the rolling elements migrates to the raceway of the inner ring and the outer ring, thus providing a lubricating action.

The fluorocarbon resin composition forming the pocket member provides a favorable result in the case where the fluorocarbon resin composition consists of the PTFE and in the case where calcium carbonate or copper powder is added to the PTFE.

The means for mixing and kneading the fluorocarbon resin composition and the method for forming the pocket member by molding it can be carried out in a manner similar to the method of forming the main body of the cage of the first resin composition.

In the method of mounting the pocket member 6 on the pocket portion 5a, an adhesive agent NF Nitofix SK-299 for a cryogenic-temperature produced by NITTO DENKO Corporation is applied to an outer circumference of the pocket member 6, and the pocket member 6 is mounted on the pocket portion 5a from the inner-ring side of the main body of the cage 5. The NF Nitofix SK-299 forms the stable adhesive layer 7 between the resin composition of the pocket member 6 and the resin composition of the main body of the cage 5 and absorbs a dimensional shrinkage of the resin composition of the pocket member 6 and the resin composition, of the main body of the cage 5, different from the resin composition of the pocket member 6 in the cryogenic-temperature, thus stably fixing both to each other. Consequently a stable sliding surface is formed on the pocket member and the rolling element. Thus the strength and lubricating property of the cage are compatible with each other at the cryogenic-temperature. As an adhesive agent for bonding the different materials to each other at the cryogenic-temperature, an adhesive agent of the two-part type is preferable. In the example, the NF Nitofix SK-299 (main component: epoxy resin, component of hardening agent: polyamide, mixing ratio: 1:1) was used.

The pocket member 6 bonded to the pocket portion 5a of the cage 5 wears owing to the sliding contact between the pocket member 6 and the rolling elements to generate worn powder. The worn powder forms a lubricating film on the sliding surface of the pocket member 6 that slidingly contacts the rolling elements. Therefore the cage 5 withstands a use in the cryogenic-temperature environment.

The plan configuration of the pocket portion 5a of the cage 5 and that of the pocket member 6 shown in FIGS. 1 and 2 are stretched circular but may be perfectly circular. As disclosed in Japanese Patent Application Laid-Open No. 58-180839, the stretched circular configuration means a configuration constructed of two half circles of radius approximate to the radius of the balls, which are disposed at both sides of a gap of some width. It is preferable to form the stretched circular configuration which has a large gap to absorb the delay in the advance of the balls and which is capable of decreasing a load applied to the cage.

When a radial load and an axial load are simultaneously applied to a high-speed ball bearing, delay occurs in the advance of balls. As a result, a circumferential force is generated between the cage and the balls. In a bearing used in environment in which liquid hydrogen or liquid oxygen is present, a friction coefficient between the balls and the raceway is high. Thus it is difficult for both to slide on each other. Thereby the circumferential force is directly applied to the cage, which may break a cage having a low strength. To overcome this problem, the gap is set large to absorb the delay in the advance of the balls. Thereby it is possible to apply a decreased load to the cage.

In the present invention, by substitutingly using a less expensive cage without using a cage consisting of a composite material special and expensive in the production cost, it is possible to much reduce the production cost of the rolling bearing which is used at the cryogenic-temperature.

The bearing of the present invention is suitably used for a turbopump using liquid hydrogen or liquid oxygen. Because the liquid hydrogen or the liquid oxygen flows smoothly, it is possible to restrain the generation of heat at the contact point between the rolling elements and the raceway of the inner ring as well as the raceway of the outer ring, the sliding-contact point between the rolling elements and the surface of the pocket portion, and the sliding-contact point between the outside surface of the cage and the inside surface of the outer ring.

INDUSTRIAL APPLICABILITY

Because the bearing of the present invention has the above-described construction, the bearing can be preferably used in the cryogenic-temperature environment in which liquid hydrogen, liquid oxygen, liquid nitrogen, LNG, and the like are used or in a vacuum.

The bearing of the present invention can be preferably used for auxiliary machines of a car in the high-temperature environment in addition to the low-temperature environment.

EXPLANATION OF REFERENCE NUMERALS AND SYMBOLS

Figure 1:
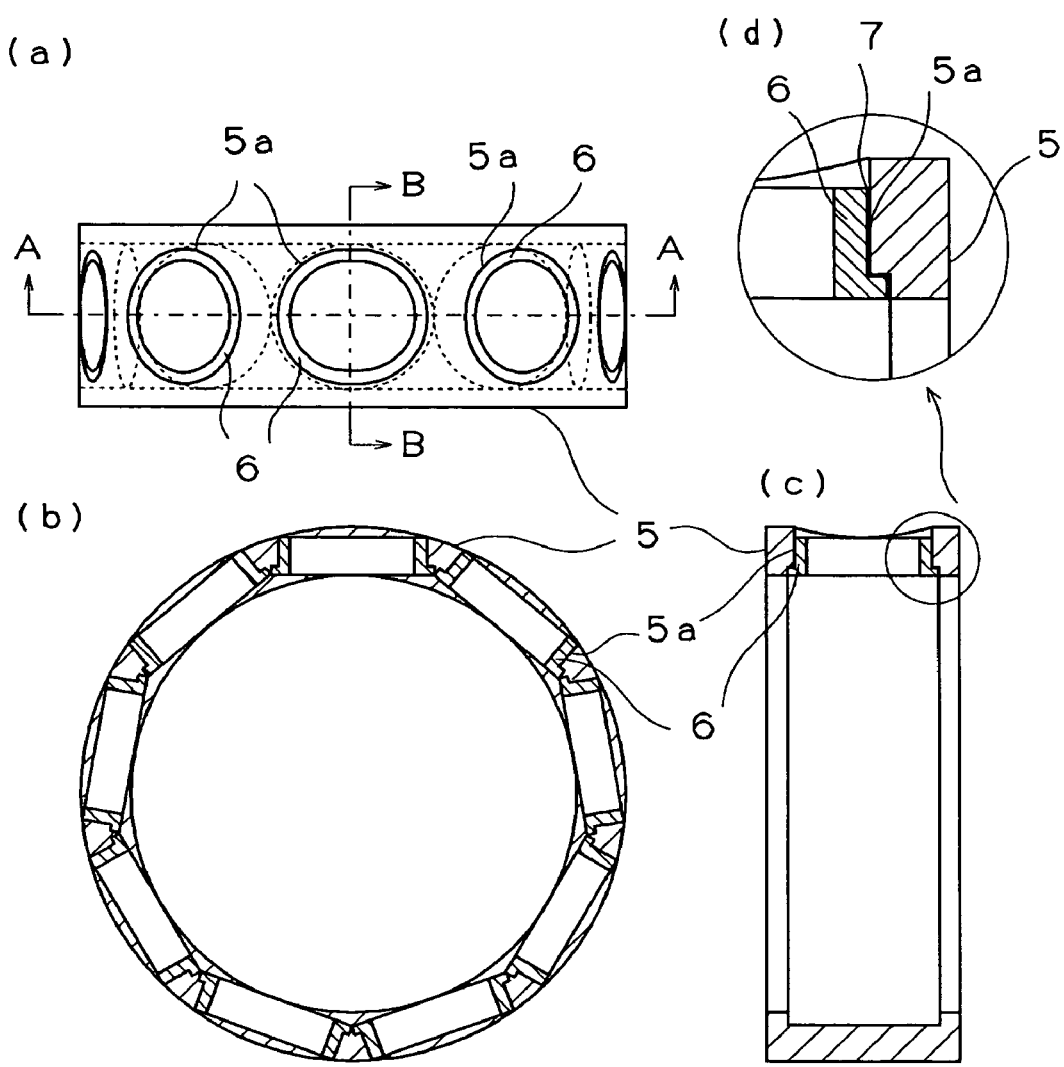
FIG. 1 is a combination view of a cage made of resin.
Figure 2:
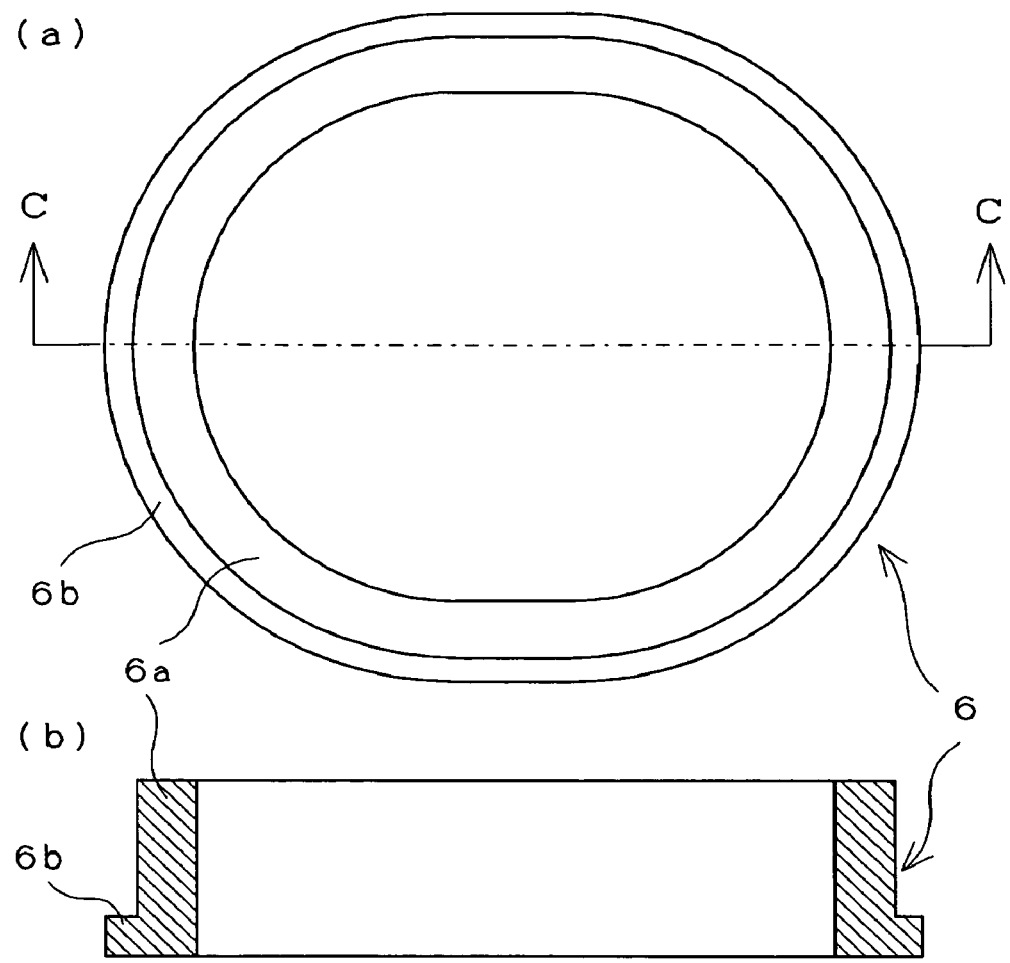
FIG. 2 are a plan view and a front view of a pocket member.
Figure 3:
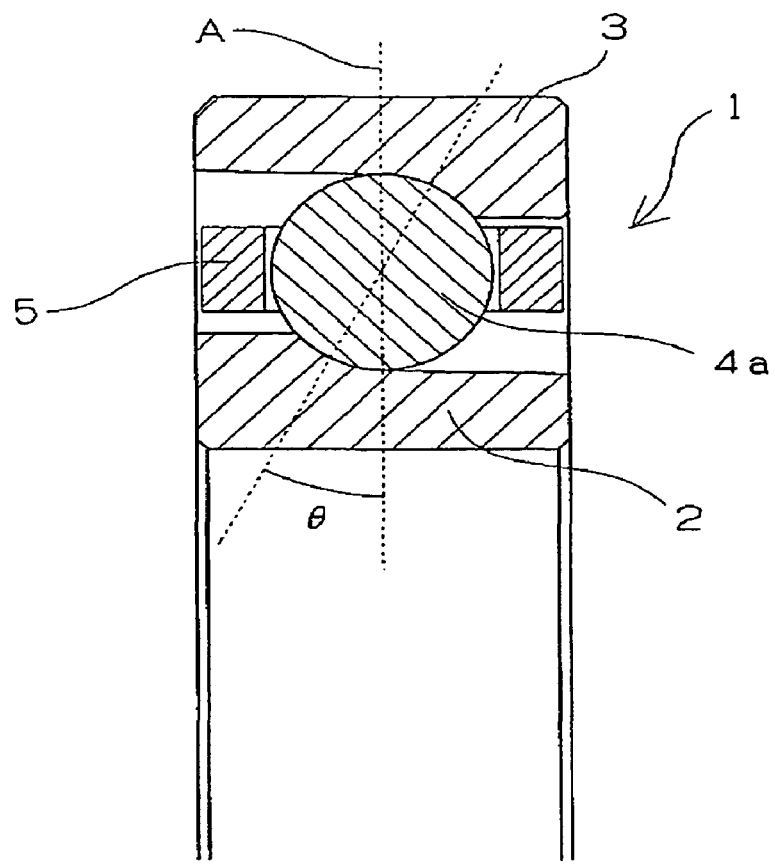
FIG. 3 is a sectional view showing a conventional angular contact ball bearing.
Figure 4:
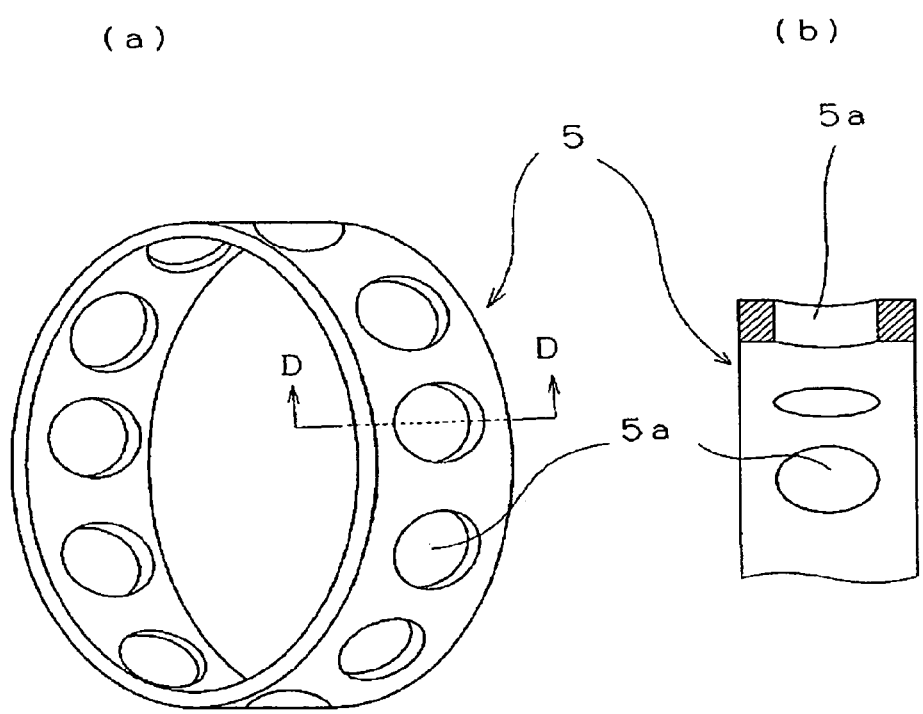
FIG. 4 is a perspective view and a side elevation of a conventional cage.

1: angular contact ball bearing
2: inner ring
3: outer ring
4: rolling element
5: cage
6: pocket member
7: adhesive layer

The invention claimed is:

1. A cage made of resin comprising: an annular main body having a plurality of pocket portions radially penetrating said main body; and a plurality of pocket members, provided on said annular main body, which hold rolling elements of a rolling bearing, wherein said main body is a molding of a first resin composition consisting of a first resin and a solid lubricant mixed therewith; and
   at least a rolling element-retaining surface of each of said pocket members is made of a second resin composition containing fluorocarbon resin as a main component thereof.

2. The cage made of resin according to claim 1, wherein said molding of said first resin composition has a tensile strength of not less than 30 MPa and a heat-resistant temperature of not less than 200.degree. C.

3. The cage made of resin according to claim 2, wherein said first resin includes at least one resin selected from the group consisting of aromatic polyether ether ketone and polyphenylene sulfide.

4. The cage made of resin according to claim 2, wherein said solid lubricant contained in said first resin composition is polytetrafluoroethylene resin.

5. The cage made of resin according to claim 2, wherein a mixing ratio of said solid lubricant to an entirety of said first resin composition is set to 10 wt % to 60 wt%.

6. The cage made of resin according to claim 1, wherein said fluorocarbon resin is polytetrafluoroethylene resin.

7. The cage made of resin according to claim 6, wherein said second resin composition contains said fluorocarbon resin and a reinforcing material.

8. A bearing comprising an inner ring, an outer ring, rolling elements interposed between said inner ring and said outer ring, and a cage for retaining said rolling elements, wherein said cage is a cage made of resin according to claim 1.

9. The bearing according to claim 8, wherein said bearing is used for a turbopump, of a rocket engine, which uses a liquid fuel.

10. The cage made of resin according to claim 1,
   wherein said pocket members have a cylindrical portion with a flange portion formed on a peripheral edge of said cylindrical portion,
   wherein said pocket members are mounted on said pocket portions of said main body with said flange portion directed toward the inner-ring side of said cage.

11. The cage made of resin according to claim 10 wherein the plan configuration of each of said pocket portions and the plan configuration of each of said pocket members are stretched in a circular configuration.

12. The cage made of resin according to claim 10, wherein said pocket members are mounted on said pocket portions of said main body by using an epoxy resin based adhesive agent having a hardening agent consisting of polyamide.

13. The cage made of resin according to claim 1, wherein the fluorocarbon resin migrates to the sliding surfaces of the rolling elements, the resin to be migrated and attached migrates to the raceway of the inner ring and the outer ring, providing a lubricating system.

14. A method of making a cage made of resin, said cage comprising an annular main body having a plurality of pocket portions radially penetrating said annular main body and a plurality of pocket members, provided on said annular main body, which hold rolling elements of a rolling bearing for use is a cryogenic-temperature environment, said method comprising molding said annular main body of a first resin composition consisting of a first resin and a solid lubricant mixed therewith; and molding at least a rolling element-retaining surface of each of said pocket members from a second resin composition containing fluorocarbon resin as a main component thereof.

* * * * *